United States Patent [19]

Fischer et al.

[11] 3,824,568

[45] July 16, 1974

[54] SINGLE WALL DOMAIN PROPAGATION ARRANGEMENT

[75] Inventors: Robert Frederick Fischer, Livingston; Paul Herman Schmidt, Chatham; Edward Guerrant Spencer, Murray Hill, all of N.J.

[73] Assignee: Bell Telephone Laboratories, Incorporated, Murray Hill, N.J.

[22] Filed: Nov. 24, 1972

[21] Appl. No.: 309,211

[52] U.S. Cl.340/174 TF, 340/174 EB, 340/174 PM, 340/174 VA

[51] Int. Cl. .......... G11c 11/14

[58] Field of Search .......... 340/174 TF

[56] References Cited

UNITED STATES PATENTS 3,701,129 10/1972 Copeland .......... 340/174 TF 3,736,579 5/1973 Marsh .......... 340/174 TF 3,753,814 8/1973 Pulliam .......... 340/174 TF

*Primary Examiner*—James W. Moffitt

*Attorney, Agent, or Firm*—H. M. Shapiro

[57] ABSTRACT

The deposition of an epitaxial layer, in which single wall domains can be moved, on a nonplanar surface of a suitable substrate results in a nonplanar layer in which the domains can be moved in response to a rotating magnetic field in the absence of structured magnetically soft elements. An alternative to the familiar T- and bar-permalloy elements in "field access" single wall domain devices results.

10 Claims, 7 Drawing Figures

PATENTED JUL 16 1974

3,824,568

SINGLE WALL DOMAIN PROPAGATION ARRANGEMENT

FIELD OF THE INVENTION

This invention relates to information storage arrangements and more particularly to such arrangements in which information is represented as patterns of single wall magnetic domains hereinafter referred to as magnetic "bubbles".

BACKGROUND OF THE INVENTION

Magnetic bubbles and the movement of bubbles in a magnetic medium are well known in the art. One arrangement for moving bubbles is commonly referred to as the "field access" arrangement. In accordance with this arrangement, a pattern of magnetic elements is formed at a surface of the magnetic medium. The pattern comprises elements having geometries to respond to a magnetic field reorienting (viz: rotating) in the plane of the magnetic medium to generate continuously offset field gradients to move domains along a path defined by the pattern.

A typical bubble medium is an epitaxially deposited layer having a preferred direction of magnetization along an axis normal to the plane of the layer. The layer has its magnetization in a first direction along that axis and a bubble has its magnetization in a second direction along that axis. A bias field in the first direction is operative to constrict a bubble to a preset operating diameter and the magnetic elements locally vary this bias field by generating changing pole patterns in response to the rotating field.

Typically, the magnetic elements are formed from a layer of magnetically soft material, such as Permalloy, by by familiar photolithographic techniques.

BRIEF DESCRIPTION OF THIS INVENTION

In accordance with this invention, a field access magnetic bubble arrangement is achieved by an alternative structure for defining the requisite magnetic elements. It is customary to form the bubble material on a substrate comprising a nonmagnetic single crystal substrate having an ideally planar growth surface. In contradistinction, this invention is based on the discovery that the above-mentioned growth surface can be machined by, for example, ion milling techniques to produce a surface in base-relief on which the bubble material is thereafter grown epitaxially. The invention is also based on the realization that when the surface of the substrate is machined in periodic, preset patterns, "magnetic elements" are formed by the nonplanar geometries (or areas) in the bubble material itself for producing propagation paths for bubble movement therealong in response to a magnetic field reorienting in the (idealized) plane of the now nonplanar bubble medium (or layer).

DETAILED DESCRIPTION

Figure 1:
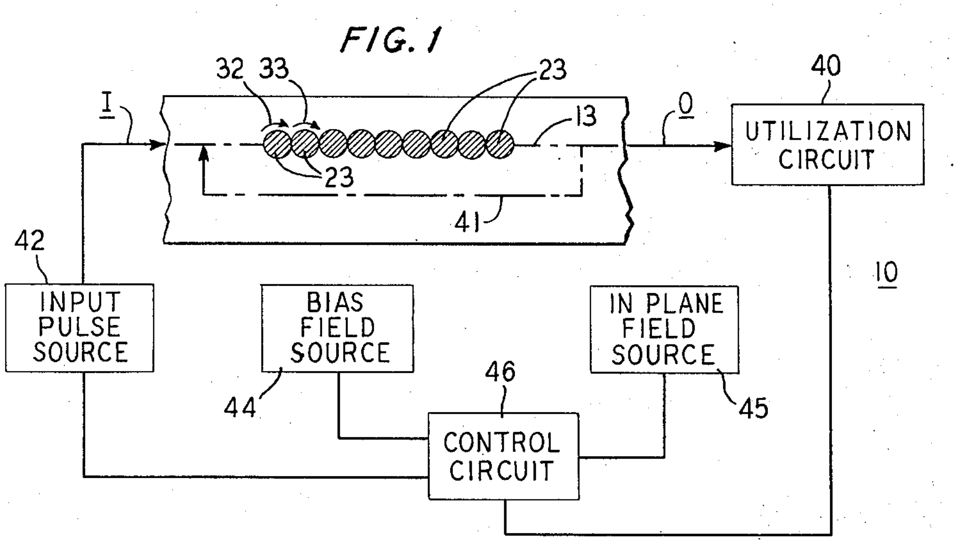
FIG. 1 is a schematic representation of a bubble propagation arrangement in accordance with this invention.

FIG. 1 shows an arrangement 10 in accordance with this invention. The arrangement comprises a layer 11 of material in which single wall domains can be moved along a path 13 between input and output positions indicated by arrows I and O, respectively.

Figure 2:
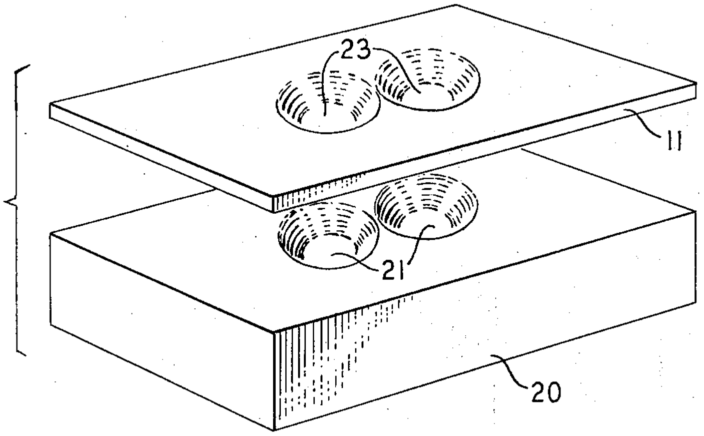
FIGS. 2, 3, and 4 are schematic representations of portions of the arrangement of FIG. 1 showing magnetic conditions therein during operation.

Path 13 is defined in layer 11 by growing that layer on a nonplanar substrate. FIG. 2 shows layer 11 separated from a substrate 20. It is to be understood that layer 11 is grown epitaxially on the surface of substrate 20 and is actually integral with that substrate. Therefore, although FIG. 1 shows layer 11 separate from the substrate, this is merely to facilitate the description of the invention.

Substrate 20 comprises a nonplanar surface including recesses 21. When layer 11 is formed on such a substrate (20) the resulting layer includes nonplanar geometries or areas, a representative pair of which is designated 23 in FIG. 2. It has been discovered that domains in layer 11 associated with these nonplanar geometries respond to magnetic field reorienting in the plane of layer 11 to move domains in the field-access mode.

Figure 3:
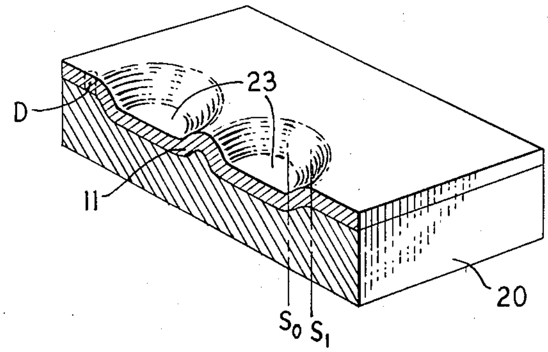
Figure 4:
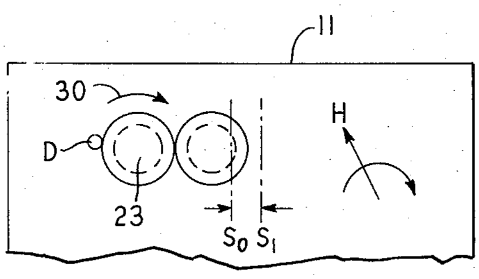

FIGS. 3 and 4 show a projection and top view, respectively, of a representative (pair of) nonplanar area(s) of layer 11 about which a domain D moves in response to a clockwise rotating in-plane field H in FIG. 4. The domain moves about the periphery of the geometry in a clockwise direction, in response, as indicated by the curved arrow 30 in FIG. 4.

Movement of a domain along a path such as 13 of FIG. 1 is achieved by a sequence of the nonplanr geometries shown in FIG. 3. For an oscillating (or rotating) in-plane field first directed to the left in FIG. 1, then to the right moving clockwise through an upward direction as reviewed in FIG. 1, a domain moves along the upper portion of the peripheries of consecutive geometries 23 as indicated by the curved arrows 32 and 33 in the FIG. 1.

Figure 5:
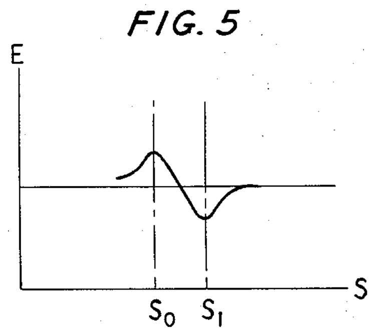
FIG. 5 is a graph of energy versus distance for a portion of the arrangement of FIG. 1.

FIG. 5 shows a plot of energy E versus distance S from the edge of the recessed portion of nonplanar geometry 23 of FIGS. 3 and 4 a distance between S0 and S1 as shown in those figures. An energy minimum occurs in the planar portion of layer 11 just exterior to 23. Thus a domain D follows about the exterior of the periphery of 23 as indicated by the curved arrow 30 in FIG. 4.

Path 13 of FIG. 1 is formed by areas 23 which either abut one another in the illustrative arrangement as shown in FIG. 1 or are spaced apart less than about a domain diameter as shown in FIG. 3. The domain moves from one area to the next, remaining stationary at the intersection between adjacent areas for one-half of the in-plane field cycle moving from left to right as viewed.

Domains moved in this manner arrive at an output position desingaged O at which point detection or recirculation occurs. If detection is to occur, typically a familiar magnetoresistance element (not shown) is disposed at O for applying a signal to utilization circuit 40 of FIG. 1. If recirculation is to occur, areas 23 are arranged to provide a recirculating path indicated by broken arrow 41 of FIG. 1. Actually, the lower periphery of adjacent areas 23 are operative to move domains from right to left in FIG. 1 and thus constitute recirculating path 41.

Domains are generated selectively at I OF FIG. 1 by any one of a variety of generator arrangements well known in the art. One suitable generator is disclosed in copending application Ser. No. 303,327 filed Nov. 3, 1972 and now U.S. Pat. No. 3,789,375 for Y. Chen, T. J. Nelson, J. Geusic, and H. M. Shaprio. A suitable generator is indicated by block 42 in FIG. 1 labeled "input pulse source". Of course, in the absence of an input pulse from such a source, no domain is generated and thus a domain pattern representative of information is formed for detection at O.

In practice, domains are maintained at a nominal diameter by a bias field supplied by a source, typically a permanent magnetic, represented by block 44 in FIG. 1. Domain movement is by means of a magnetic field rotating in the plane of layer 11 and supplied by a source represented by block 45 of FIG. 1.

The various sources and circuits are synchronized and activated by a control circuit 46 and may be any such elements capable of operating in accordance with this invention.

Figure 6:
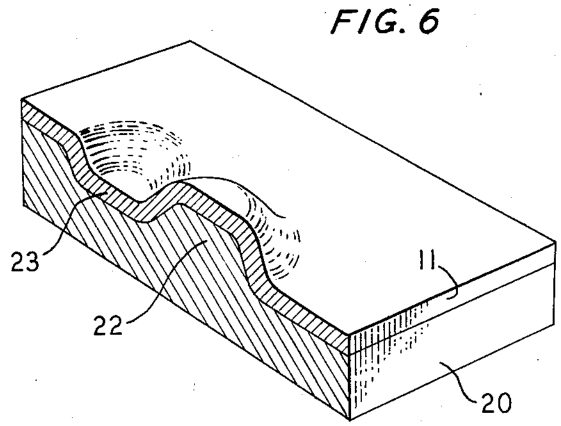
FIGS. 6 and 7 are schematic representations of portions of an arrangement alternative to that shown in FIG. 1.
Figure 7:
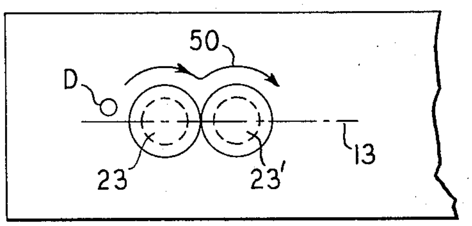

A variety of circuits may be formed by forming a substrate in relief prior to the formation of an epitaxial layer thereon. FIG. 3 shows a substrate where depressions are formed prior to deposition. Of course, raised geometries are possible as are combinations of raised and depressed geometries. FIGS. 6 and 7 show cross section and top views of a representative pair of depressed and raised geometries 23 and 23', respectively, forming a path 13. A domain D follows a path indicated by broken arrow 50 of FIG. 7 traversing the pair of areas shown in a single cycle of the in-plane field.

It is hypothesized that the growth of an epitaxial film on a nonplanar substrate produces a structured differential strain in the resulting layer. This may be due partially to the growth of the layer on different crystal faces. For example, domain layers are usually grown on 111 crystal faces whereas the 110 crystal faces are exposed for growth in (the out-of-plane) portions of each nonplanar geometry of the substrate.

On the other hand, the nonplanar geometry of the deposition surface results in an epitaxial layer typically of nonuniform thickness. The layer in the recess is usually thicker than that on the planar portion of the epitaxial layer. Accordingly, domain size and the collapse diameter for the domain varies depending on the position of a domain with respect to the recess. Moreover, should ion milling be used to produce the nonplanar substrate, that process produces an amorphous surface in each recess. Subsequent epitaxial deposition may be different in the recess than in the planar portions accordingly. But epitaxial deposition proceeds first by dissolving perhaps a few atomic layers of the surface of the substrate. Thus, the contribution of the nature of the deposition surface to the underlying phenomenon here is not yet ascertained.

Nevertheless, it is clear that a deposition surface of a nonmagnetic substrate can be structured so that an epitaxial layer deposited thereon includes nonplanar geometries which produce domain movement in the layer responsive to a magnetic field reorienting in the plane of the film. Raised T- and bar-shaped structures, depressed triangles, half moon, circular geometries, etc. have been tried experimentally.

In one specific example an epitaxial layer of $Eu_1Er_2Ga_{.7}Fe_{4.3}O_{12}$ was grown from the liquid phase on Gadolinium Gallium Garnet to a thickness of 4 microns. The layer exhibited a nominal bubble size of 6 microns with a bias field range of 134 oersteds to 182 oersteds. The surface of the substrate was ion milled to a depth of about 3,000 Angstrom units leaving disk-shaped raised areas with diameters of 25 microns. The ion beam had a nominal energy of 1,000 electron volts and impinged on the deposition surface at angle of 30 degrees. Argon ions were used at a vacuum pressure of $2 \times 10^{-4}$ torr (mm of mercury). Domain movement about the nonplanr geometries was achieved with a magnetic field of 50 oersteds.

What is claimed is:

1. Apparatus comprising a single crystal substrate including a nominally planar first surface, said surface having a repetitive pattern of features which forms into a nonplanar configuration said surface.

2. Apparatus in accordance with claim 1 also including an epitaxial layer formed on said first surface, said layer having a nonplanar geometry in accordance with said pattern of features and being capable of having single wall domains moved therein.

3. Apparatus in accordance with claim 2 wherein said elements are of geometries to move domains thereabout responsive to a magnetic field reorienting in the plane of said layer.

4. Apparatus in accordance with claim 3 including means for providing said magnetic field.

5. Apparatus in accordance with claim 3 wherein said elements comprise features from the plane of said first surface.

6. Apparatus in accordance with claim 3 wherein said elements comprise features recessed into said substrate from the plane of said first surface.

7. Apparatus in accordance with claim 3 wherein said elements are defined by features both raised and recessed from the plane of said first surface of said substrate.

8. A magnetic arrangement comprising a layer of material in which single wall domains can be moved, said layer being characterized by an epitaxial layer formed on a nonplanar crystal substrate having a surface in relief in a pattern for defining in said layer a path for moving domains therealong responsive to a reorienting in-plane field.

9. The method of making single wall magnetic domain apparatus comprising the steps of forming a periodic nonplanar pattern of elements in the surface of a single crystal substrate and growing on said resulting nonplanar surface an epitaxial layer capable of having single wall domains moved therein.

10. The method in accordance with claim 9 wherein said pattern of elements is formed by ion milling.

* * * * *

UNITED STATES PATENT OFFICE
CERTIFICATE OF CORRECTION

Patent No. 3,824,568 Dated July 16, 1974

Inventor(s) Robert F. Fischer, Paul H. Schmidt, Edward G. Spencer

It is certified that error appears in the above-identified patent and that said Letters Patent are hereby corrected as shown below:

Col. 2, line 16, after "FIG." change "1" to --2--. Col. 3, line 4, after "I" change "OF" to --of--. Col. 4, line 23, after "forms" cancel "into"; line 24, before "said" cancel "a nonplanar configuration" and insert after "surface" --into a nonplanar configuration--.

Signed and sealed this 5th day of November 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
★ U.S. GOVERNMENT PRINTING OFFICE : 1969 O—366-334.